United States Patent
Finstad

(10) Patent No.: US 10,137,838 B2
(45) Date of Patent: Nov. 27, 2018

(54) CART APPARATUSES WITH OPERABLE STEPS

(71) Applicant: Cannon Equipment LLC, Cannon Falls, MN (US)

(72) Inventor: Clemance Bernard Finstad, Bay City, WI (US)

(73) Assignee: Cannon Equipment LLC, Cannon Falls, MN (US)

( * ) Notice: Subject to any disclaimer, the term of this patent is extended or adjusted under 35 U.S.C. 154(b) by 7 days.

(21) Appl. No.: 15/719,856

(22) Filed: Sep. 29, 2017

(65) Prior Publication Data

US 2018/0194292 A1    Jul. 12, 2018

Related U.S. Application Data

(60) Provisional application No. 62/444,116, filed on Jan. 9, 2017.

(51) Int. Cl.
  *B62B 3/02* (2006.01)
  *B60R 3/02* (2006.01)
  *B62B 5/04* (2006.01)

(52) U.S. Cl.
  CPC .............. *B60R 3/02* (2013.01); *B62B 3/02* (2013.01); *B62B 5/0433* (2013.01); *B62B 5/0457* (2013.01); *B62B 2301/0463* (2013.01)

(58) Field of Classification Search
  None
  See application file for complete search history.

(56) References Cited

U.S. PATENT DOCUMENTS

| | | | |
|---|---|---|---|
| 604,482 A | * | 5/1898 | Seaman |
| 3,434,566 A | | 3/1969 | Miller |
| 3,984,117 A | | 10/1976 | Bates et al. |
| 4,174,021 A | | 11/1979 | Barlock |
| 4,485,892 A | | 12/1984 | Maloney et al. |
| 4,652,003 A | | 3/1987 | Karashima |
| 5,170,529 A | | 12/1992 | Kovacs |

(Continued)

FOREIGN PATENT DOCUMENTS

| FR | 2849637 | 1/2003 |
|---|---|---|
| JP | 19910143721 | 6/1991 |
| JP | 2002114340 | 4/2002 |

OTHER PUBLICATIONS https://www.taiwantrade.com/product/standard-picking-ladder-cart-829794.html visited on Dec. 16, 2016.

(Continued)

*Primary Examiner* — John D Walters
*Assistant Examiner* — Hilary L Johns
(74) *Attorney, Agent, or Firm* — Andrus Intellectual Property Law LLP

(57) ABSTRACT

A cart apparatus for moving objects includes a frame that defines a cavity and steps operably coupled to the frame. The steps are movable into and between an inoperable position in which the steps are nested in the cavity and an operable position in which the steps are at least partially outside the cavity. One of the steps and the frame has a guide pin, and the other of the steps and the frame defines a slot in which the guide pin is slideably received. The slot is configured to guide the steps into and between the inoperable position and the operable position as the guide pin slides in the slot.

19 Claims, 9 Drawing Sheets

(56) References Cited

U.S. PATENT DOCUMENTS

| | | |
|---|---|---|
| 7,025,548 B2 | 4/2006 | Krawczyk et al. |
| 7,213,816 B2 | 5/2007 | Gregory et al. |
| 7,320,472 B2 | 1/2008 | Gregory et al. |
| 7,487,859 B2 | 2/2009 | Wang |
| 7,516,997 B2 | 4/2009 | Kuznarik et al. |
| 7,815,266 B2 | 10/2010 | Sun et al. |
| 8,146,710 B2 | 4/2012 | Moldthan et al. |
| 8,764,031 B2 | 7/2014 | Finstad et al. |
| 8,931,420 B2 | 1/2015 | Larson et al. |
| 9,149,114 B2 | 10/2015 | Finstad et al. |
| 9,422,768 B2 | 8/2016 | Yoo et al. |
| 2014/0231172 A1* | 8/2014 | Stewart .................. E06C 9/06 182/127 |
| 2015/0001005 A1 | 1/2015 | Goodson |
| 2016/0082996 A1 | 3/2016 | Jackson et al. |
| 2016/0160561 A1 | 6/2016 | Yu |
| 2017/0314327 A1* | 11/2017 | Green .................... E06C 5/04 |

OTHER PUBLICATIONS http://www.putnamrollingladder.com/library.html visited on Dec. 16, 2016.
http://www.nationalcart.com/introducingtheladdercartandstaircart/ visited on Dec. 16, 2016.
https://www.wanzl.com/en_DE/products/orderpickingtrolleys/kt3orderpickingtrolley/ visited on Dec. 16, 2016.
https://www.grainger.com/product/Grainger-Approved-Stock-Picking-Ladder-Cart-4EY10?searchBar=true&searchQuery=sps-hf-2852 visited on Dec. 16, 2016.

\* cited by examiner

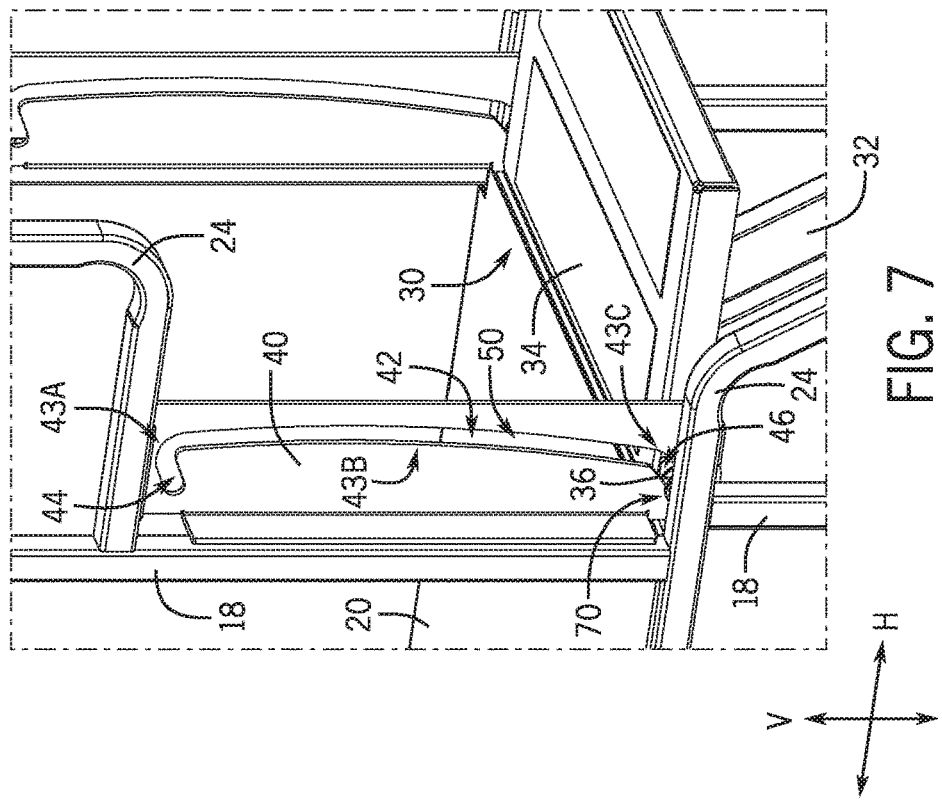
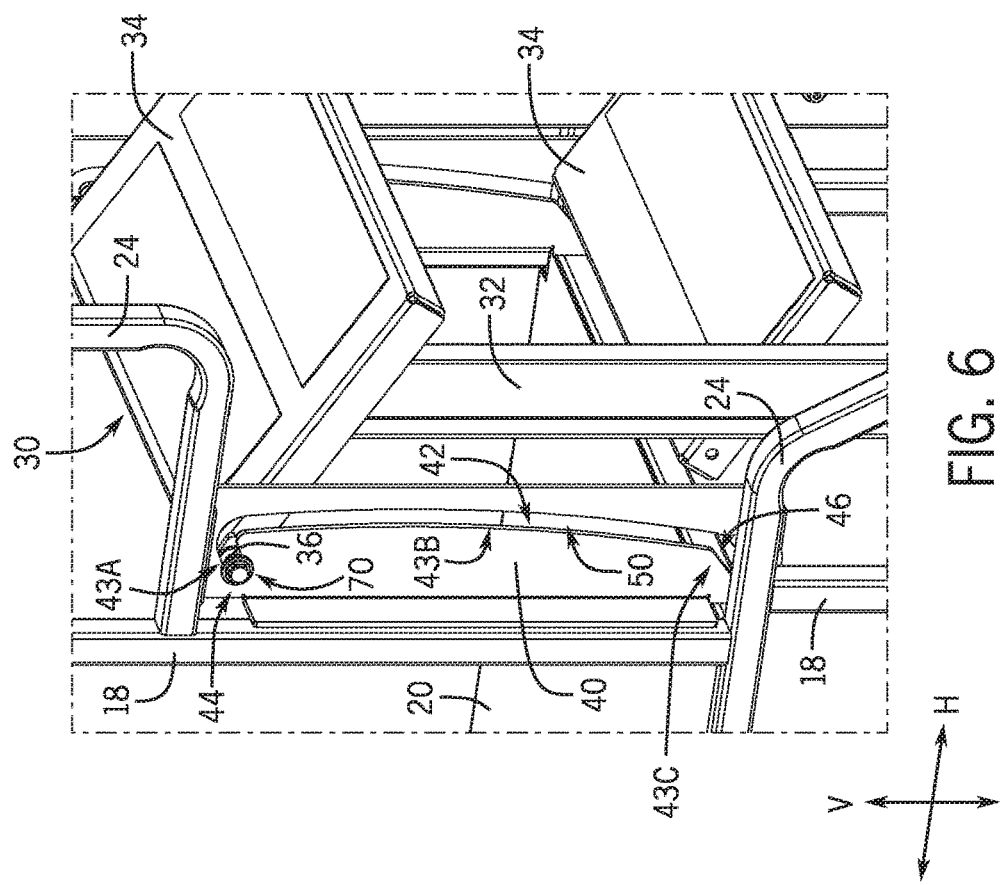

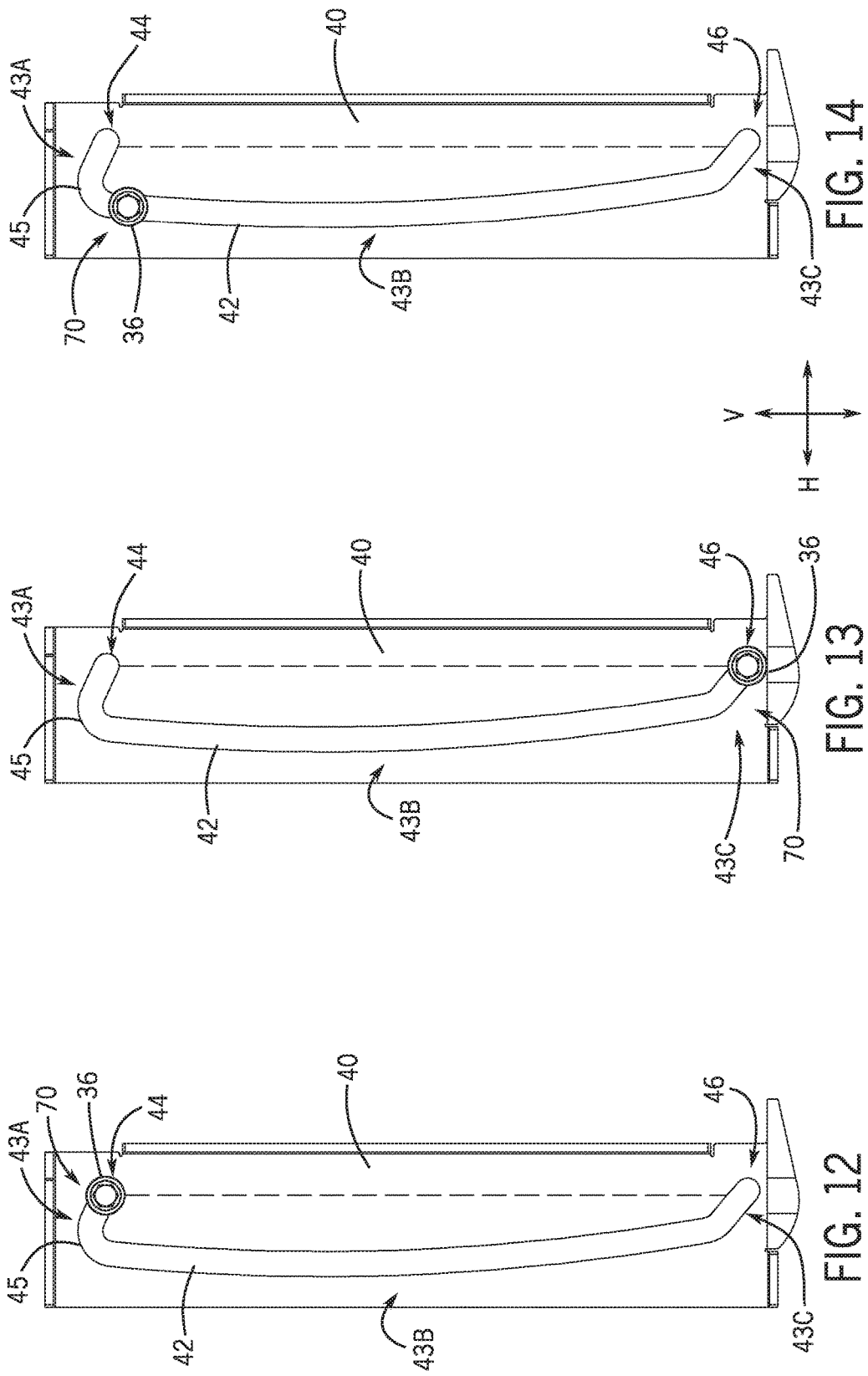

CART APPARATUSES WITH OPERABLE STEPS

CROSS REFERENCE TO RELATED APPLICATIONS

The present application is based on and claims priority to U.S. Provisional Patent Application No. 62/444,116 filed Jan. 9, 2017, the disclosure of which is incorporated herein by reference

FIELD

The present disclosure relates to cart apparatuses with operable steps, specifically cart apparatuses with steps that can be moved into and between an inoperable position and an operable position.

BACKGROUND

The following U.S. Patents are incorporated herein by reference, in entirety:

U.S. Pat. No. 4,174,021 discloses a ladder truck for use in stores for transporting goods from central storage to display shelves and for facilitating the loading of such goods on display shelves. The ladder truck comprises a wheeled truck having attached to one end a stepladder.

U.S. Pat. No. 5,170,529 discloses a wheel lock mechanism for use in carts and the like for releasably locking an opposed pair of swivel caster wheels of such carts. The wheel lock mechanism includes a lever arm extending outwardly from the cart operable by the foot of an operator for moving a locking mechanism between a wheel locking position and a free-wheeling position.

U.S. Pat. No. 9,149,114 discloses a cabinet having a deep shelf with limited access and includes at least two opposite sides carrying track means to permit easy adjustment of the shelf between two or more levels by a single person maneuvering only the one accessible end of the shelf. The cabinet can be mounted on wheels to form a cart.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

An example cart apparatus of the present disclosure includes a frame that defines a cavity and steps operably coupled to the frame. The steps are movable into and between an inoperable position in which the steps are nested in the cavity and an operable position in which the steps are at least partially outside the cavity. One of the steps and the frame has a guide pin, and the other of the steps and the frame defines a slot in which the guide pin is slideably received. The slot is configured to guide the steps into and between the inoperable position and the operable position as the guide pin slides in the slot.

BRIEF DESCRIPTION OF THE DRAWINGS

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

FIG. 6 is an enlarged view within line 6-6 of FIG. 1.

FIG. 7 is an enlarged view within line 7-7 of FIG. 2.

FIG. 12 is an enlarged view of an example plate having a slot. A guide pin of a roller assembly is positioned at a first end of the slot when the steps are in the inoperable position.

FIG. 13 is a view like FIG. 12 with the guide pin of the roller assembly positioned at a second end of the slot when the steps are in the operable position.

FIG. 14 is a view like FIG. 12 with the guide pin of the roller assembly positioned in a middle portion of the slot when the steps are in a locked position.

DETAILED DESCRIPTION OF THE DRAWINGS

Figure 1:
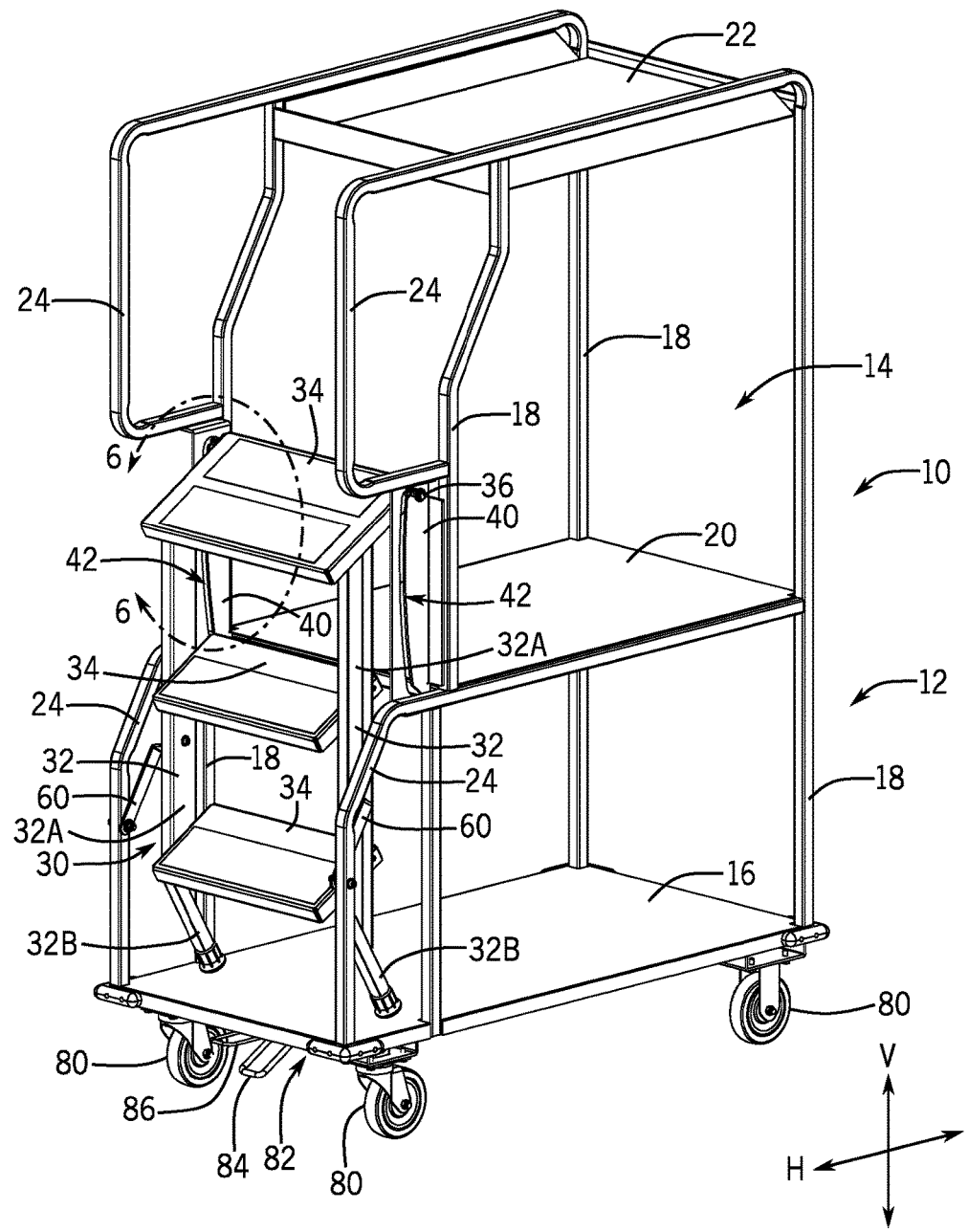
FIG. 1 is an example cart with steps in an inoperable position.

In the present description, certain terms have been used for brevity, clarity, and understanding. No unnecessary limitations are to be inferred therefrom beyond the requirement of the prior art because such terms are used for descriptive purposes only and are intended to be broadly construed. The different apparatuses described herein may be used alone or in combination with other apparatuses. Various equivalents, alternatives, and modifications are possible within the scope of the appended claims.

Movable storage or stocking carts are typically utilized by businesses to transport objects (e.g. merchandise, saleable items, equipment, marketing materials) within a building. The present inventors have recognized that as an operator (e.g. employee) moves a cart through the building, the operator often carries separate steps with them. These separate and "loose" steps can be accidentally dropped or can accidentally bump other objects (e.g. walls, staged merchandise, customers) thereby causing bodily injury and/or damage. Accordingly, through research and development the present inventors have developed the cart of the present disclosure that includes steps which are operably connected to the cart. Furthermore, the cart of the present disclosure permits the steps to be moved within the cart when the steps are not in use.

FIGS. 1-9 depict an example cart 10 of the present disclosure that is for moving materials and objects (e.g. boxes). The cart 10 includes a frame 12 that defines a cavity 14 in which objects can be placed. The frame 12 comprises a base 16 and a plurality of support members 18 that extend from the base 16. The frame 12 further includes a shelf 20 disposed in the cavity 14 vertically above the base 16. The base 16 has a horizontal depth (H1 on FIG. 4) that is greater than the horizontal depth of the shelf 20 (H2 on FIG. 4). That is, the depth of the base 16 (H1 on FIG. 4) is greater than the depth of the shelf 20 (H2 on FIG. 4).

A top 22 is positioned vertically above the shelf 20. The shelf 20 and the top 22 are coupled to the support members 18 such that objects placed on the shelf 20 and/or the top 22 are vertically supported thereon, respectively. To increase the stability of the cart 10, the top 22 has a horizontal depth (H3 on FIG. 4) that is less than the horizontal depth of the shelf 20 (H2 on FIG. 4). The frame 12 includes handles 24 that can be grasped by an operator to move and maneuver the cart 10.

Figure 2:
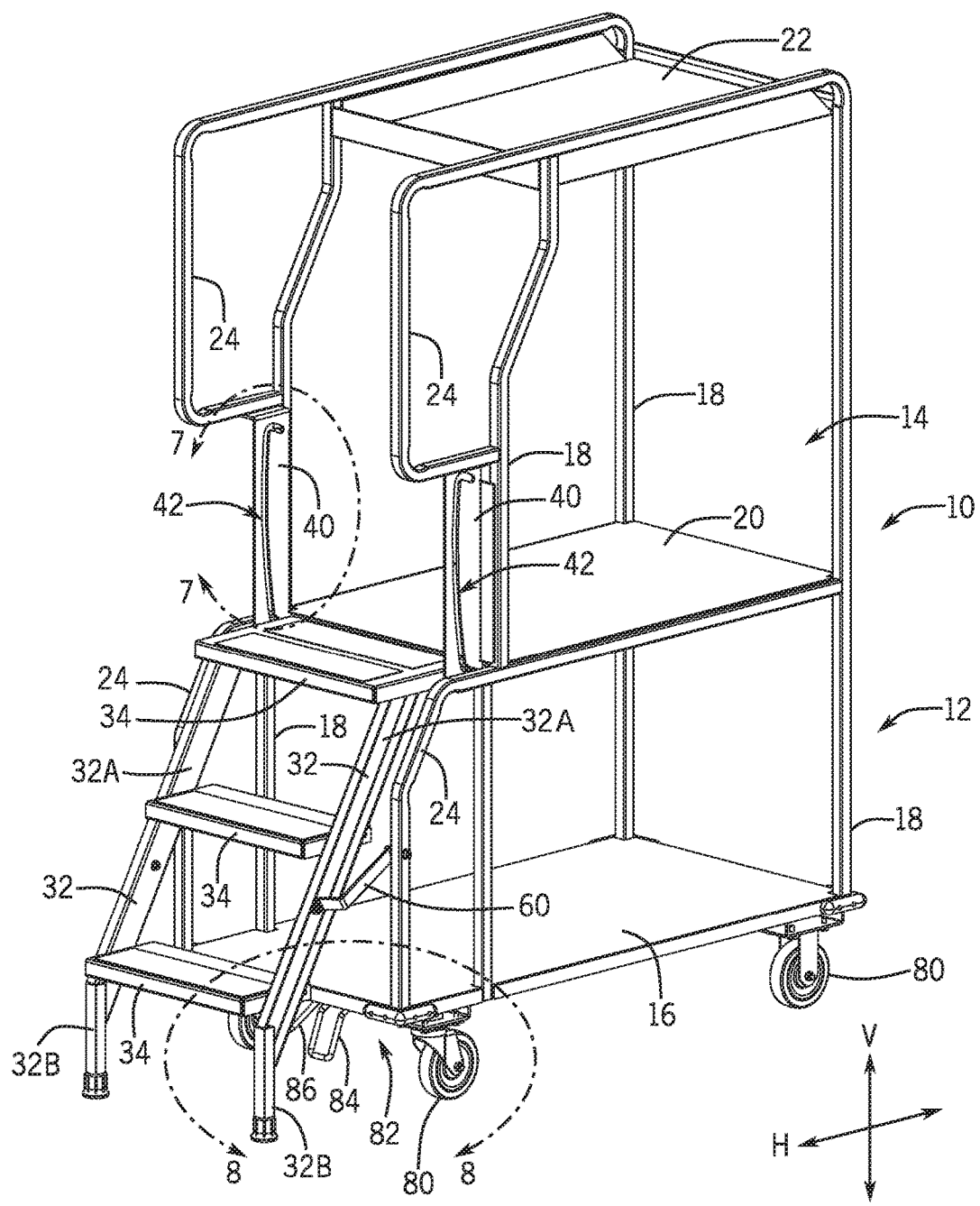
FIG. 2 is the cart of FIG. 1 with the steps in an operable position.
Figure 3:
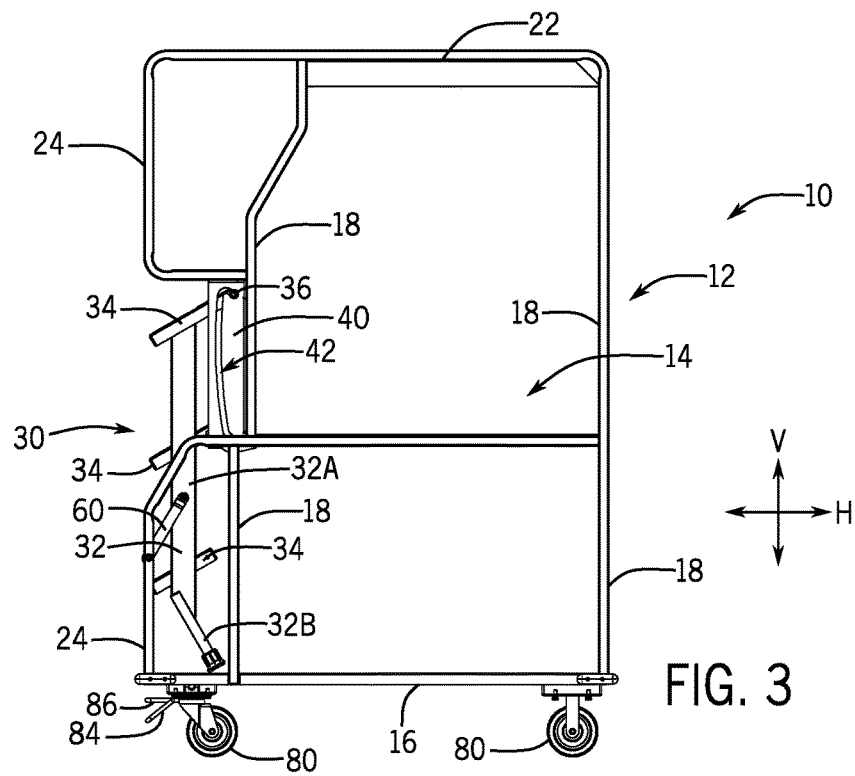
FIG. 3 is a side view of the cart of FIG. 1.
Figure 4:
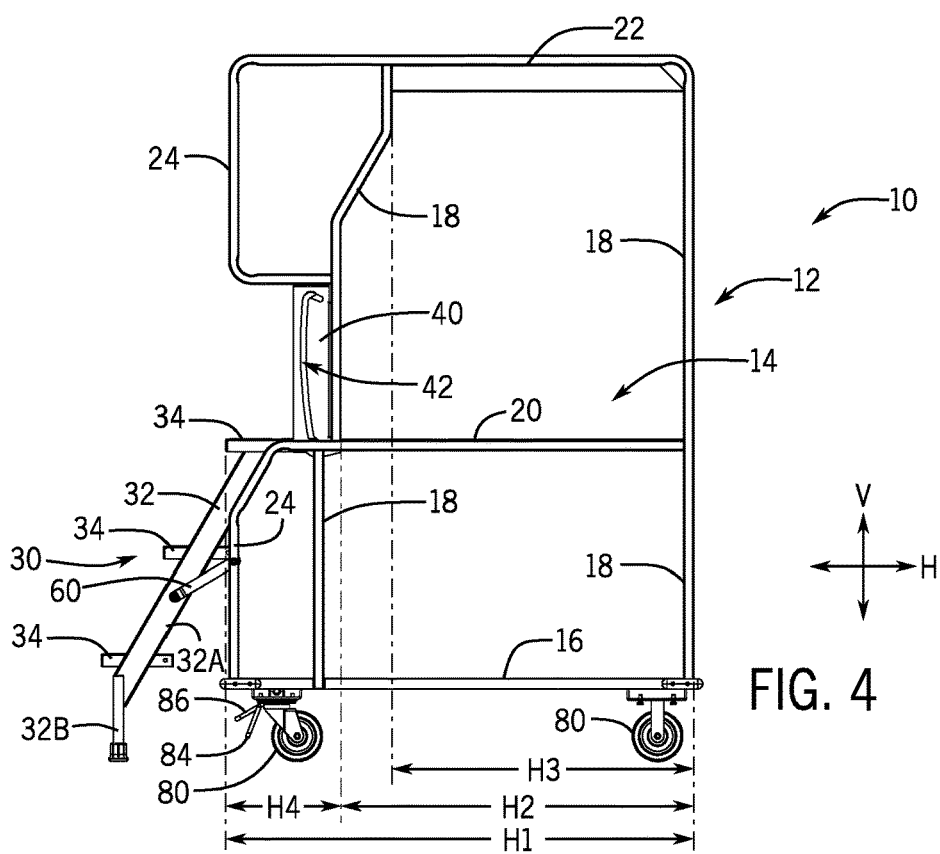
FIG. 4 is a side view of the cart of FIG. 2.
Figure 5:
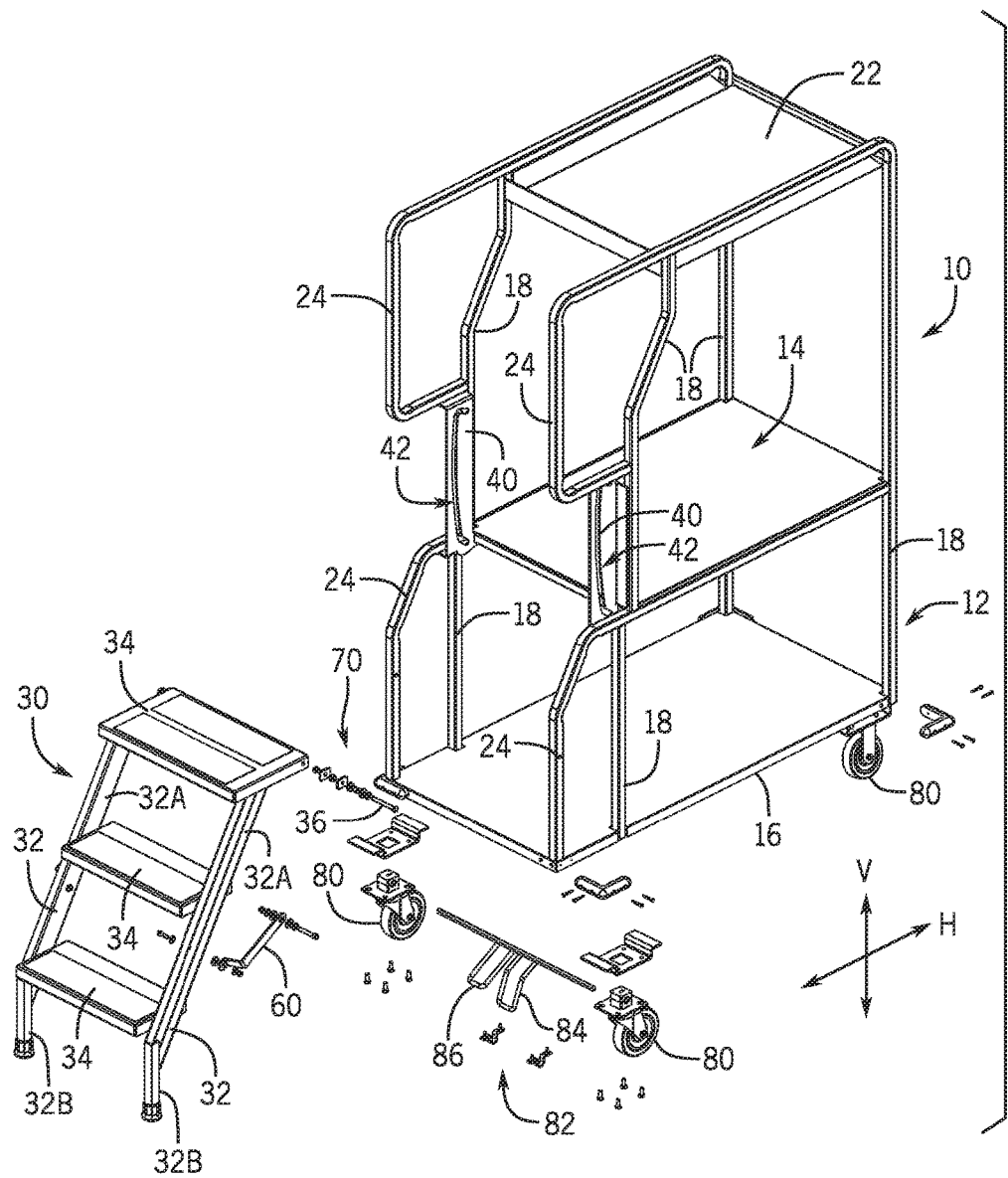
FIG. 5 is an exploded view of the cart of FIG. 2.
Figure 8:
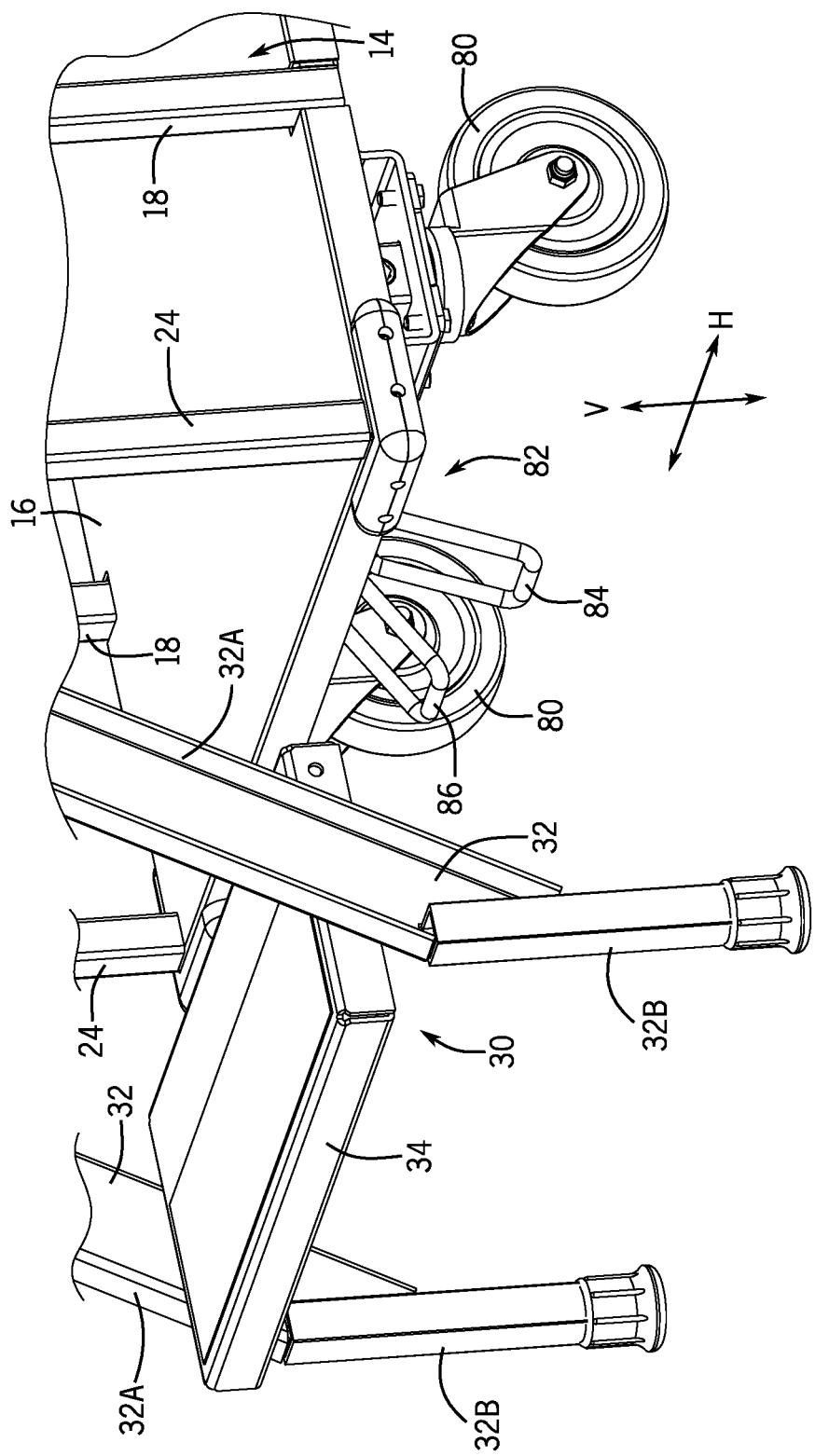
FIG. 8 is an enlarged view within line 8-8 of FIG. 2.
Figure 9:
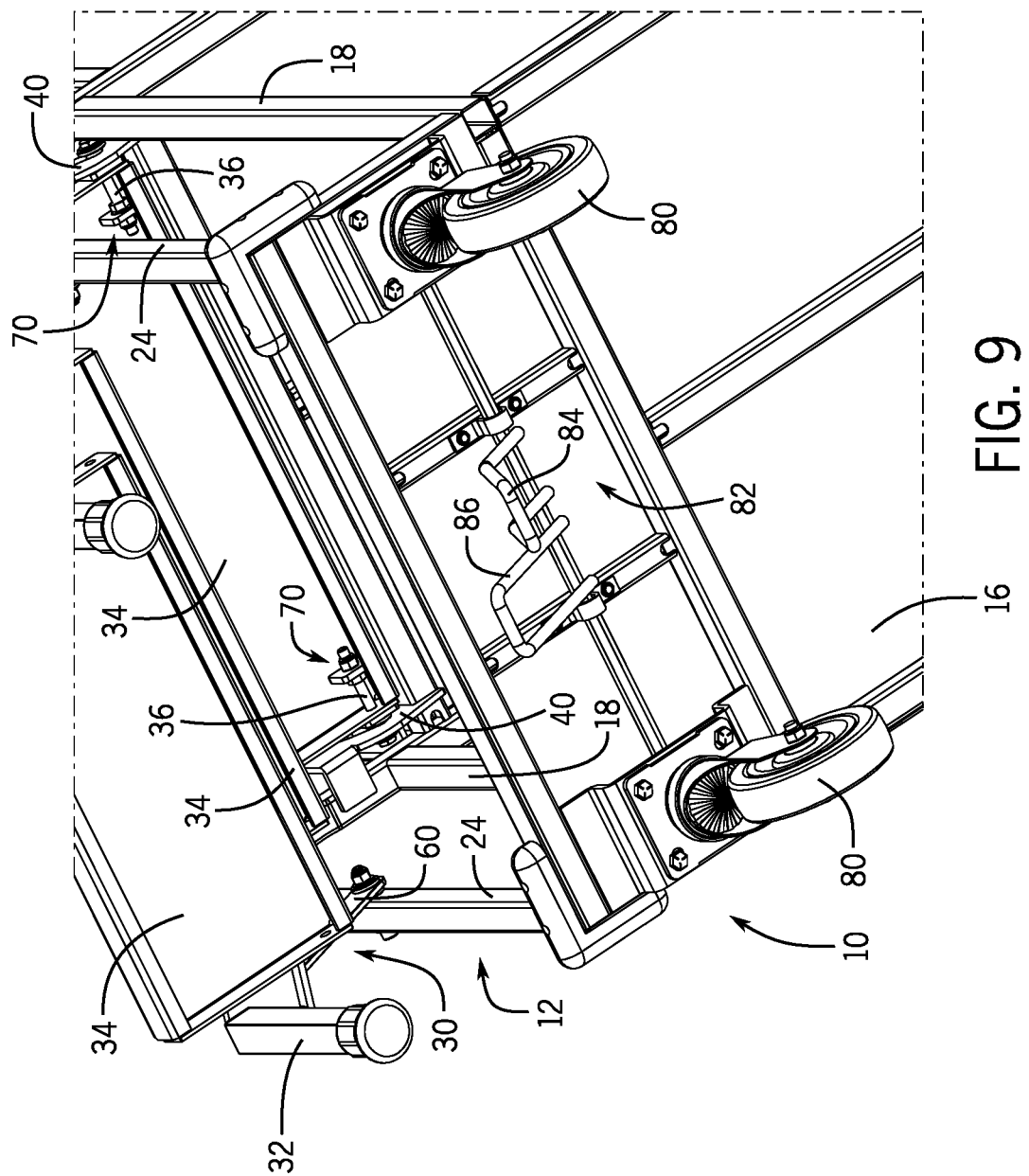
FIG. 9 is a view like FIG. 8 showing a partial bottom view of cart of FIG. 2.
Figure 10:
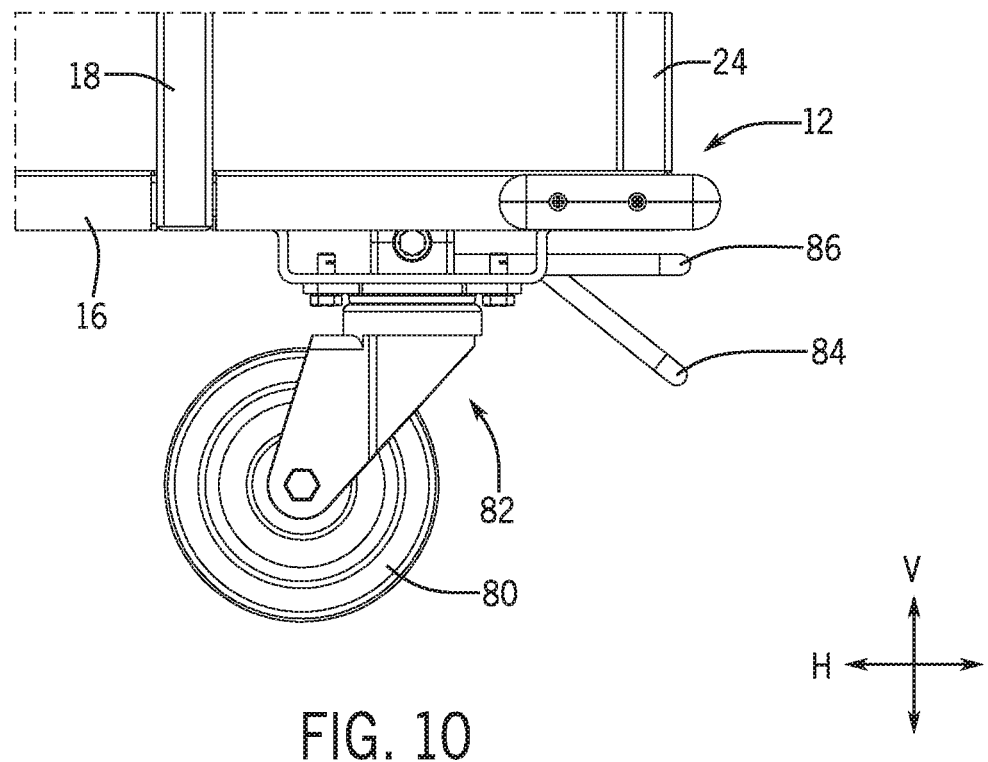
FIG. 10 is a side view of a locking assembly in a disengaged position.
Figure 11:
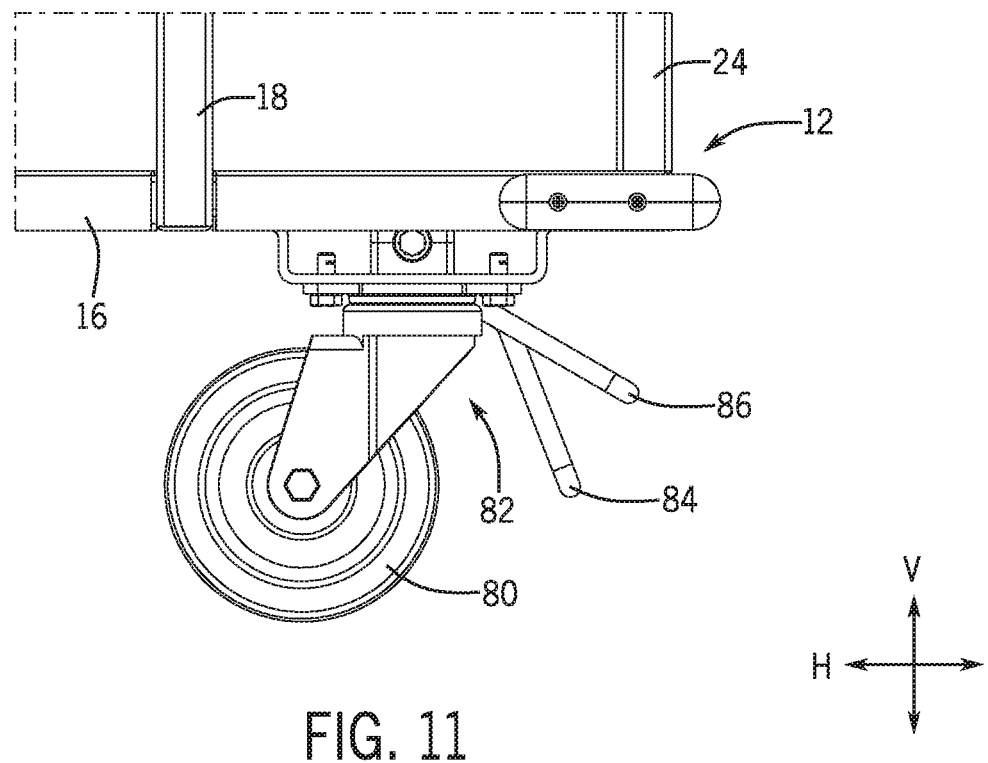
FIG. 11 is a view like FIG. 10 with the locking assembly in an engaged position.

Steps 30 are coupled to the frame 12 such that the steps 30 are movable into and between an inoperable position in which the steps 30 are nested in the cavity 14 (FIGS. 1 & 3) and an operable position in which the steps 30 are at least partially outside of the cavity 14 and the frame 12 (FIGS. 2 & 4). The steps 30 include a pair of opposing legs 32 and a plurality of treads 34 that extend between the opposing legs 32. The opposing legs 32 and the treads 34 are fixedly coupled to each other, and each opposing leg has an upper or first section 32A and a lower or second section 32B that extends transverse to the first section 32A. While in the inoperable position (FIGS. 1 & 3), the steps 30 are vertically directly above the base 16. The uppermost tread 34 of the steps 30 aligns (i.e. is flush) with the shelf 20 of the frame 12 when the steps 30 are in the operable position (FIGS. 2 & 4). The uppermost tread 34 has a horizontal depth (H4 on FIG. 4), and the horizontal depth of the uppermost tread 34 (H4 on FIG. 4) and the horizontal depth of the shelf 20 (H2 on FIG. 4) equate to the horizontal depth of the base 16 (H1 on FIG. 4). That is, the length of the uppermost tread 34 (H4 of FIG. 4) added with the length of the shelf 20 (H2 on FIG. 4) equals the length of the base 16 (H1 on FIG. 4).

The steps 30 include a guide pin 36 that is slidable (i.e. slidably received) in a slot 42 defined by a plate 40 which may be part of the frame 12. The slot 42 is configured to guide the steps 30 into and between the inoperable position (FIGS. 1 & 3) and the operable position (FIGS. 2 & 4) as the steps 30 are moved by the operator and/or as the guide pin 36 slides in the slot 42. In certain examples, the plate 40 is positioned within the cavity 14.

The slot 42 has a first end 44 (FIG. 6) that receives and retains the guide pin 36 when the steps 30 are in the inoperable position (FIGS. 1 & 3) and a second end 46 (FIG. 6) opposite the first end 44 that receives the guide pin 36 when the steps 30 are in the operable position (FIGS. 2 & 4). The second end 46 is disposed vertically directly below the first end 44.

The steps 30 are configured to move from the inoperable position (FIGS. 1, 3, & 6) to the operable position (FIGS. 2, 4, & 7) when the operator applies a force (i.e. a lifting force, pulling force, rotational force, and/or a combination force thereof) to the steps 30 such that the guide pin 36 slides away from the first end 44 and through upper portion 43A (FIG. 6) of the slot 42 toward the second end 46. The upper portion 43A is positioned between the first end 44 and the second end 46 and disposed vertically above the first end 44 of the slot 42 such that the guide pin 36 vertically upwardly slides through the upper portion 43A and then vertically downwardly moves toward the second end 46 as the steps 30 move from the inoperable position (FIGS. 1, 3, & 6) to the operable position (FIGS. 2, 4, & 7). That is, the guide pin 36 vertically downwardly slides through a middle portion 43B (FIG. 6) and a lower portion 43C (FIG. 6) of the slot 42 toward the second end 46 as the steps 30 are moved from the inoperable position (FIGS. 1, 3, & 6) to the operable position (FIGS. 2, 4, & 7). The guide pin 36 is configured to slide through the middle portion 43B and the lower portion 43C toward the second end 46 under force of gravity when the steps 30 are moved from the inoperable position (FIGS. 1 & 3) to the operable position (FIGS. 2 & 4).

When the steps 30 are moved in the opposite direction, i.e. the steps 30 are moved from the operable position (FIGS. 2, 4, & 7) to the operable position (FIGS. 1, 3, & 6), the guide pin 36 vertically upwardly slides from the second end 46 through the lower portion 43C and the middle portion 43B toward the first end 44. The guide pin 36 is configured to slide through the upper portion 43A to the first end 44 under force of gravity when the steps 30 are moved from the operable position (FIGS. 2, 4, & 7) to the inoperable position (FIGS. 1, 3, & 6).

Referring specifically to FIGS. 12 and 13, the upper portion 43A is positioned between the first end 44 and the second end 46. The upper portion 43A is sloped (i.e. the upper portion 43A is vertically upwardly sloped) such that the upper portion 43A has a maximum point 45 that is vertically above the first end 44. The lower portion 43C is vertically below the upper portion 43A and extends horizontally away from the second end 46 of the slot 42 such that the steps 30 horizontally outwardly moves relative to the frame 12 (FIGS. 3-4) when the guide pin 36 slides through the lower portion 43C. The lower portion 43C is sloped (i.e. the lower portion 43C is vertically downwardly sloped). The middle portion 43B extends from and is transverse to the upper portion 43A and the lower portion 43C. The middle portion 43B is horizontally outwardly curved from the first and second ends 44, 46 and/or the frame 12 (FIGS. 3-4) (i.e. the middle portion 43B is "bowed" outwardly away from the frame 12).

The slot 42 and the cart 10 are further configured to prevent inadvertent movement of the steps 30 from the inoperable position (FIGS. 1 & 3) to the operable position (FIGS. 2 & 4). Specifically, the steps 30 are configured to move to a locked position (not shown) between the inoperable position (FIGS. 1 & 3) and the operable position (FIGS. 2 & 4) when a jostling force (e.g. a force that results from the cart 10 being jostled or rolling over a bump) acts on the steps 30. When the steps 30 are in the locked position, the guide pin 36 is trapped in the slot 42 (see FIG. 14; e.g. the guide pin 36 is trapped in the middle portion 43B (FIG. 6) of the slot 72) and the opposing legs 32 of the steps 30 rest on the base 16 (similar to position of the opposing legs 32 on the base 16 as shown in FIG. 3 when the steps 30 are in the inoperable position). That is, the jostling force may cause the guide pin 36 to vertically upwardly slide from the first end 44, through the upper portion 43A past the maximum point 45, and into the middle portion 43B where the guide pin 36 becomes trapped (i.e. is prevented from further moving toward the second end 46 due to the positioning of the guide pin 36 and the legs 32 relative to each other) and the opposing legs 32 rest on the base 16 (FIG. 3). Accordingly, the steps 30 remain in the locked position until the operator applies a force to the steps 30 to thereby move the steps 30 to the inoperable position (FIGS. 1 & 3) or the operable position (FIGS. 2 & 4). The ability of the steps 30 to move to the locked position when a jostling force acts on the steps 30 prevents injury to the operator and/or damage to nearby objects.

In certain examples, the guide pin 36 is part of a roller assembly 70 that rolls relative to the slot 42 as the steps 30 move into and the between the inoperable position (FIGS. 1 & 3) to the operable position (FIGS. 2 & 4). The roller assembly 70 includes at least one washer (not shown) that is configured to prevent excessive lateral movement of the guide pin 38 and/or the steps 30 relative to the slot 42 and/or frame 12, respectively.

The cart 10 includes a hinge member 60 that is pivotally coupled to the frame 12 and the steps 30 and configured to guide the steps 30 into and the between the inoperable position (FIGS. 1 & 3) and the operable position (FIGS. 2 & 4). The hinge member 60 is further configured to limit rotational movement of the steps 30 such that the steps 30 primarily translate as the steps 30 move into and between the inoperable position (FIGS. 1 & 3) and the operable position (FIGS. 2 & 4). The hinge member 60 pivots at least 90 degrees relative to the handle 24 and/or the frame 12 when the steps 30 are moved into and between the inoperable position (FIGS. 1 & 3) and the operable position (FIGS. 2 & 4). The hinge member 60 extends from the cavity 14 when the steps 30 are in the operable position (FIGS. 2 & 4), and the hinge member 60 is positioned in the cavity when the steps 30 are in the inoperable position (FIGS. 1 & 3).

Referring to FIGS. 8-11, the cart 10 includes a plurality of caster wheels 80 that enable horizontal movement of the cart 10. The number, type, and configuration of caster wheels 80 relative to the frame 12 can vary from that which is shown. In the depicted example, the caster wheels 80 are coupled to the base 16.

The cart 10 includes a locking assembly 82 disposed vertically directly below the steps 30 such that the locking assembly 82 can be selective activated by an operator to thereby prevent movement of at least one of the plurality of caster wheels 80 prior to moving the steps 30 into and between the inoperable position (FIGS. 1 & 3) and the operable position (FIGS. 2 & 4). The locking assembly 82 includes a first pedal 84 and a second pedal 86. In operation, the first pedal 84 is depressed by the operator (i.e. the operator vertically downwardly presses the first pedal 84) which causes the locking assembly 82 to engage the caster wheels 80 and thereby "lock" movement of the caster wheels 80 such that the caster wheels 80 cannot freely rotate. The operator disengages the locking assembly 82 by applying a lifting force to the second pedal 86 (i.e. the operator uses a foot to vertically lift up on the second pedal 86) which allows the caster wheel 80 to rotate freely. The locking assembly 82 is rendered inaccessible, including blocked, to the operator when the steps are in the operable position (FIGS. 2 & 4) such that the locking assembly 82 cannot be inadvertently disengaged and/or the caster wheels 80 "unlocked" when the steps are in the operable position (FIGS. 2 & 4). Reference is made the above incorporated U.S. Patents for further description of example conventional locking assemblies and operation thereof.

What is claimed is:

1. A cart apparatus comprising:
a frame defining a cavity; and
steps coupled to the frame such that the steps are movable into and between an inoperable position in which the steps are nested in the cavity and an operable position in which the steps are at least partially outside the cavity; and
wherein one of the steps and the frame has a guide pin and wherein the other of the steps and the frame defines a slot in which the guide pin is slideable, wherein the slot is configured to guide the steps into and between the inoperable position and the operable position as the guide pin slides in the slot; and
wherein the slot has an upper portion between the first end and the second end that is vertically disposed above the first end of the slot, and wherein the guide pin vertically upwardly slides through the upper portion and then vertically downwardly in the slot toward the second end as the steps are moved from the inoperable position to the operable position.

2. The cart apparatus according to claim 1, wherein the slot has a first end in which the guide pin is retained when the steps are in the inoperable position.

3. The cart apparatus according to claim 2, wherein the slot has an opposite, second end in which the guide pin is retained when the steps are in the operable position.

4. The cart apparatus according to claim 3, wherein the second end is disposed directly vertically below the first end.

5. The cart apparatus according to claim 3, wherein the steps are configured to move from the inoperable position to the operable position when a force is applied to the steps such that the guide pin slides away from the first end and through the upper portion of the slot.

6. The cart apparatus according to claim 5, wherein the guide pin is configured to slide through the upper portion to the first end under force of gravity as the steps are moved from the operable position to the inoperable position.

7. The cart apparatus according to claim 3, wherein the slot has a lower portion positioned between the upper portion and the second end, and wherein the guide pin is configured to slide through the lower portion to the second end under force of gravity as the steps are moved from the inoperable position to the operable position.

8. The cart apparatus according to claim 7, wherein the slot has a middle portion positioned between the upper portion and the lower portion, and wherein the middle portion extends horizontally away from the first and second ends of the slot such that the steps horizontally outwardly move relative to the frame as the guide pin slides through the middle portion.

9. The cart apparatus according to claim 8, wherein the steps comprise legs and wherein the legs are configured to contact the ground when the steps are in the operable position and contact the frame when the steps are in the locked position.

10. The cart apparatus according to claim 3, wherein the steps are configured to move to a locked position between the inoperable position and the operable position when the steps are subjected to a jostling force that causes the guide pin to inadvertently slide in the slot away from the first end and toward the second end, and wherein the guide pin is trapped between the first end and the second end when the steps are in the locked position such that the step cannot be moved to the operable position.

11. The cart apparatus according to claim 1, further comprising a hinge member pivotally coupled to the frame and the steps and configured to guide the steps into and the between the inoperable position and the operable position.

12. The cart apparatus according to claim 11, wherein the hinge member limits rotational movement of the steps such that the steps primarily translate as the steps are moved into and between the inoperable position and the operable position.

13. The cart apparatus according to claim 12, wherein the hinge member is configured to pivot 90 degrees as the steps are moved into and between the inoperable position and the operable position.

14. The cart apparatus according to claim 12, wherein the hinge member extends from the cavity when the steps are in the operable position, and wherein the hinge member is positioned in the cavity when the steps are in the inoperable position.

15. The cart apparatus according to claim 1, wherein the frame comprises a shelf positioned in the cavity, and wherein the steps comprise a tread that is aligned with the shelf when the steps are in the operable position.

16. The cart apparatus according to claim 15, wherein the frame further comprises a base having a first horizontal depth;
   wherein the tread has a second horizontal depth
   wherein the shelf has a third horizontal depth; and
   wherein the first horizontal depth equals the summation of the second horizontal depth and the third horizontal depth.

17. The cart apparatus according to claim 16, wherein the base is parallel to the shelf and the tread when the steps are in the operable position.

18. The cart apparatus according to claim 16, wherein the frame further comprises a top positioned vertically directly above the shelf, and wherein the top has a fourth horizontal depth that is less than the third horizontal depth.

19. The cart apparatus according to claim 1, further comprising a plate in which the slot is defined, and wherein the plate is positioned in the cavity.

\* \* \* \* \*

UNITED STATES PATENT AND TRADEMARK OFFICE
CERTIFICATE OF CORRECTION

| | | |
|---|---|---|
| PATENT NO. | : 10,137,838 B2 | Page 1 of 1 |
| APPLICATION NO. | : 15/719856 | |
| DATED | : November 27, 2018 | |
| INVENTOR(S) | : Clemance Bernard Finstad | |

It is certified that error appears in the above-identified patent and that said Letters Patent is hereby corrected as shown below:

In the Claims

In Claim 1, Column 5, Line 64, after the word between, "the" should instead read --a--.

In Claim 1, Column 5, Line 65, after the word and, "the" should instead read --a--.

In Claim 2, Column 6, Line 5, after the word has, "a" should instead read --the--.

In Claim 3, Column 6, Line 8, delete "an opposite," and substitute therefor --the--.

Signed and Sealed this
Nineteenth Day of February, 2019

Andrei Iancu
*Director of the United States Patent and Trademark Office*